Dec. 4, 1923.
H. W. SKINNER
PIPE HANGER
Filed April 20, 1921
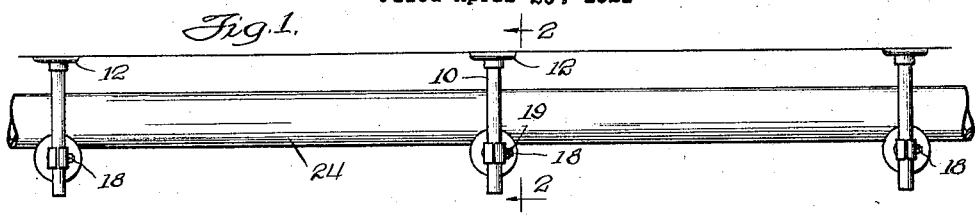
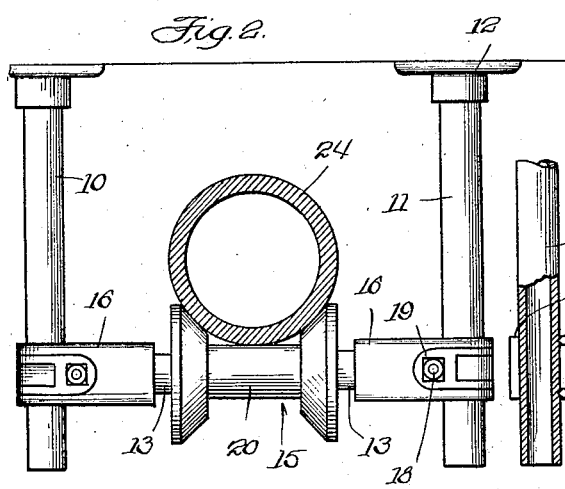
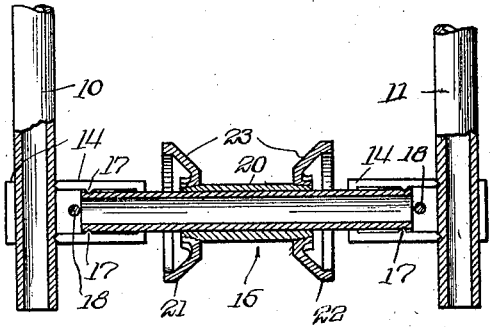
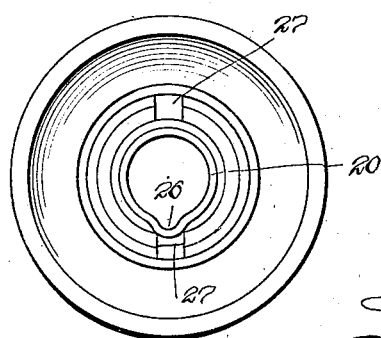
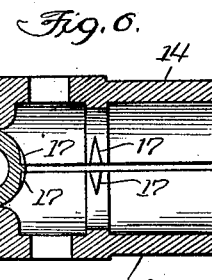
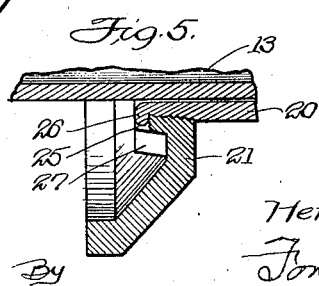
Inventor:
Henry W. Skinner Patented Dec. 4, 1923.

1,476,473

UNITED STATES PATENT OFFICE.

HENRY W. SKINNER, OF WAUKEGAN, ILLINOIS.

PIPE HANGER.

Application filed April 20, 1921. Serial No. 462,873.

*To all whom it may concern:*

Be it known that I, HENRY W. SKINNER, a citizen of the United States, residing at Waukegan, in the county of Lake and State of Illinois, have invented certain new and useful Improvements in Pipe Hangers, of which the following is a specification.

The invention relates to improvements in pipe hangers.

One of the objects of the invention is to improve pipe hangers.

Another object is to provide a pipe hanger, that is efficient, inexpensive to make, that is strong and durable, that will automatically take care of expansion and contraction of the pipes and that is adapted to accommodate pipes of varying diameters within a relatively large range.

Another object is to provide a pipe hanger in which many of the parts are duplicates and other parts are already standard requiring only a very small number of different parts to be carried in stock.

Another object is to provide a hanger that is vertically adjustable on the hanger rods.

Other, further and more specific objects of the invention will become readily apparent, to persons skilled in the art, from a consideration of the following description when taken in conjunction with the drawings, wherein:—

Fig. 1 is a side elevation of three aligning hangers shown supporting a pipe.

Fig. 2 is a section taken on line 2—2 of Fig. 1.

Fig. 3 is a longitudinal central section of a hanger.

Fig. 4 is an enlarged end view of one of the pipe supporting spools.

Fig. 5 is an enlarged section of a fragment of one of the spools.

Fig. 6 is a central axial section thru a pair of clamps.

In all the views the same reference characters are employed to indicate similar parts.

Each hanger is composed of two vertical hangers such as standard gas pipes 10 and 11 of suitable size to bear the weight and of proper length to comply with the requirements of the particular situation. The upper ends of the hanger pipes or rods may be secured to ceilings, roofs, etc., by any suitable means, as by threaded flanges 12, or the like. The two vertical parallel members 10 and 11 are connected together at their free bottom ends by a cross rod or pipe 13. A spool 15 is freely rotatable and axially movable on the cross pipe. The members 10 and 11 are secured firmly to the cross pipe 13 by clamping members 14 and 16. These members are duplicates and one of each pair is contained on each side of a pipe. Adjacent pipes are clamped and held together by a single pair of clamp members.

Each of the clamp members is provided with oppositely situated tapered nibs 17 that engage the contacting surfaces of the pipes. A bolt 18 passes thru the pair of clamping members 14 and 16 and when the nut 19 is tightened the nibs are caused to sink into the indents thus produced in the pipes and thus firmly hold them against possibility of slipping out of the clamps. By this means the clamping action is made sufficient and reliable without stretching the bolt by excessive tension and without deforming the pipes.

The spool 15 is made of a barrel 20, consisting of a piece of standard gas pipe large enough to be rotated freely on the cross pipe 13, and threaded at each end to receive the spool heads 21 and 22. The heads are dished, as shown, to provide the outwardly inclined surface 23 upon which the supported pipe 24 rests. The heads are also provided with an outturned hollow threaded hub 25 to receive the ends of the barrel 20. After the heads have been placed upon the barrel the ends of the latter are peened over, as shown at 26, to prevent the heads from backing off the barrel. The hubs are also provided with diametrically opposite notches 27 to receive a spanner wrench as a means for screwing the heads upon the ends of the barrel.

The spool 15 is shown to be relatively short so that while it is rotatable on the cross pipe 13 it may also be moved axially thereof to take care of expansion of angularly related pipes or curved pipes.

While I have herein referred to parts of the hanger as pipes, it is, of course, obvious that rods could be used instead.

Having described my invention what I claim as new and desire to secure by Letters Patent, is:—

A pipe hanger clamp comprising two like pipe clamping members for clamping and holding two pipes at right angles to each other, each member having two sharp, tapering nibs, one for each pipe, to bite into each pipe and to produce indentations therein, extending transversely of the pipes, to prevent their axial movements in the clamp and a screw bolt passing thru said clamping members between the two pairs of nibs, to indent the nibs into both pipes when said members are drawn towards each other by the bolt.

In testimony whereof I hereunto subscribed my name.

HENRY W. SKINNER.